(12) United States Patent
Varenne

(10) Patent No.: US 7,383,903 B2
(45) Date of Patent: Jun. 10, 2008

(54) ELECTRICAL POWER TRAIN FOR A VEHICLE, COMPRISING AN ELECTRICAL DISSIPATION ELEMENT COOLED BY COOLING LIQUID

(75) Inventor: Pierre Varenne, Neyruz (CH)

(73) Assignees: Conception Et Developpement Michelin S.A., Givisiez (CH); Paul Scherrer Institut, Villigen (CH)

(*) Notice: Subject to any disclaimer, the term of this patent is extended or adjusted under 35 U.S.C. 154(b) by 350 days.

(21) Appl. No.: 11/111,258

(22) Filed: Apr. 20, 2005

(65) Prior Publication Data
US 2005/0244691 A1   Nov. 3, 2005

(30) Foreign Application Priority Data
Apr. 21, 2004   (FR)  .................................. 04 04249

(51) Int. Cl.
*B60K 1/00*   (2006.01)
(52) U.S. Cl. .................... 180/65.3; 180/65.1; 180/65.2
(58) Field of Classification Search ....... 180/65.1–65.4
See application file for complete search history.

(56) References Cited

U.S. PATENT DOCUMENTS

| | | | | |
|---|---|---|---|---|
| 3,626,148 A | | 12/1971 | Woytowich et al. ........ 219/208 |
| 3,976,507 A | * | 8/1976 | Bloomfield .................. 429/17 |
| 5,058,391 A | | 10/1991 | Periot ......................... 62/238.6 |
| 5,255,733 A | * | 10/1993 | King .......................... 165/299 |
| 5,291,960 A | * | 3/1994 | Brandenburg et al. ..... 180/65.2 |
| 5,346,778 A | | 9/1994 | Ewan et al. .................. 429/19 |
| 5,537,956 A | * | 7/1996 | Rennfeld et al. ........ 123/41.29 |
| 6,087,744 A | | 7/2000 | Glauning ...................... 310/58 |
| 6,186,254 B1 | | 2/2001 | Mufford et al. ............ 180/65.3 |
| 6,347,528 B1 | * | 2/2002 | Iritani et al. ................ 62/324.6 |
| 6,448,535 B1 | | 9/2002 | Ap .............................. 219/208 |

(Continued)

FOREIGN PATENT DOCUMENTS

EP   0 633 157 A   1/1995

(Continued)

OTHER PUBLICATIONS

"Hybrid III", DISS. ETH No. 11672, 1996, p. 21 (with translation).

(Continued)

*Primary Examiner*—Christopher P. Ellis
*Assistant Examiner*—Vaughn T Coolman
(74) *Attorney, Agent, or Firm*—Fitzpatrick, Cella, Harper & Scinto

(57) ABSTRACT

An electric power train for a vehicle, the power train comprising an electrical line (61), an installation for producing electrical energy, the installation being connected to the electrical line (61), the installation having a first cooling circuit (1) using a cooling liquid, an electrical energy management unit (6), at least one electrical machine (4) connected to at least one driving wheel (40), connected to the electrical line (61) by means of an electronic control module for the electrical machine, the electrical machine (4) being connected to a second cooling circuit (2) in which a cooling liquid circulates, independent of the first cooling circuit (1), and an electrical dissipation element (8) being able to be electrically connected to the electrical line, wherein the electrical dissipation element (8) being immersed in the first cooling circuit (1).

11 Claims, 1 Drawing Sheet

U.S. PATENT DOCUMENTS

| | | | |
|---|---|---|---|
| 6,467,286 B2 * | 10/2002 | Hasebe et al. | 62/185 |
| 6,651,761 B1 * | 11/2003 | Hrovat et al. | 180/65.3 |
| 6,743,539 B2 * | 6/2004 | Clingerman et al. | 429/24 |
| 6,938,431 B2 * | 9/2005 | Hanada | 62/201 |
| 7,048,044 B2 * | 5/2006 | Ban et al. | 165/202 |
| 7,191,858 B2 * | 3/2007 | Vanderwees et al. | 180/65.3 |
| 2002/0027027 A1 | 3/2002 | Skala | 180/65.2 |
| 2003/0001440 A1 | 1/2003 | Bourqui et al. | 310/43 |
| 2003/0133267 A1 | 7/2003 | Beihoff et al. | 361/704 |
| 2003/0193009 A1 * | 10/2003 | Dill | 250/206 |
| 2005/0074649 A1 * | 4/2005 | Skiba et al. | 429/26 |
| 2005/0241865 A1 | 11/2005 | Varenee | 180/65.1 |

FOREIGN PATENT DOCUMENTS

| | | |
|---|---|---|
| EP | 1 321 330 A2 | 6/2003 |
| JP | 2004104925 | 4/2004 |
| WO | WO96/41393 | 12/1996 |

OTHER PUBLICATIONS

"Hybrid III", DISS. ETH No. 11784, 1996, pp. 30, 31, 60 and 61 (with translation).

* cited by examiner

ELECTRICAL POWER TRAIN FOR A VEHICLE, COMPRISING AN ELECTRICAL DISSIPATION ELEMENT COOLED BY COOLING LIQUID

CROSS-REFERENCE TO RELATED APPLICATIONS

This application claims the benefit of French Patent Application No. 04/04249, filed Apr. 21, 2004, which is incorporated herein by reference in its entirety.

BACKGROUND OF THE INVENTION

Field of the Invention

The present invention relates to motor vehicles with fuel cells. More particularly, the present invention relates to the management of electrical energy in certain transient phases.

Without repeating the reasons leading to producing electrical energy on board a vehicle rather a vehicle rather than being content with storing it, it is well known that one of the possibilities for producing electrical energy is to use a fuel cell. Another of the known possibilities is to drive an electrical machine by means of a motor using fossil fuel, for example an internal combustion engine. In the latter case, the so-called "serial hybrid" architecture and the so-called "parallel hybrid" architecture are known. The installations for producing electrical energy on board a vehicle are therefore diverse.

In some configurations, it is difficult to abruptly cancel out the power produced by these installations. This is particularly true in the case with fuel cells, since they are in general supplied with oxygen by compressing the ambient air in real time at the time of use, which supposes a certain amount of inertia related to the inertia of the compressor. In some configurations, it has been observed that the reaction of a fuel cell to changes in power is not very dynamic, much less dynamic than an internal combustion engine.

This is true both when the power requirement increases and when the power requirement decreases. In some cases, for example, when the vehicle driver wishes to slow down abruptly after demanding full acceleration, just prior to that, the electrical power absorbed by a serial hybrid vehicle or one with a fuel cell may drop very abruptly, much more rapidly than the power produced by the installation. However, it may happen that storing electrical energy is impossible, for example, because there is no electrical accumulator or because, if the vehicle is provided with a battery of accumulators, these are already at their maximum charge. It is then necessary to dissipate the electrical energy produced in excess by the installation.

Moreover, it is well known that electrical machines are reversible. Thus, in an electrical traction motor vehicle, the electrical machine coupled mechanically to the driving wheels can be used as an electric motor to provide the propulsion of the vehicle, supplying electrical energy to the electrical machine. The latter can be used also as an electrical generator during the vehicle braking phases and in this case it converts the mechanical braking energy into electrical energy that the vehicle must absorb, possibly by thermal dissipation. This operating mode is often referred to as "electrical braking."

Though a common-sense objective is to recover the energy as much as possible during braking of the vehicle, it is known that this recovery comes up against the characteristics of the electrical energy storage devices currently known. If the electrical machine is made to function as a generator at the maximum torque of which it is capable, a very intense current will be sent over the electrical line. However, the majority of batteries are not capable of absorbing high charging currents. Only capacitors can absorb charging currents as high as discharge currents, but their storage capacity remains low. The technology of supercapacitors may prove to be advantageous for automobile applications by offering a storage capacity per unit mass (that is to say an energy density) which is greater than capacitors and allows higher charging currents than batteries. Despite everything, installing accumulators always gives rise to an increase in weight proportional to their storage capacity, for the same technology. In addition, whatever the technology used for storing the electrical energy, the impossibility of continuing the accumulation of electrical energy when the charging state of the devices used is at its maximum is always encountered.

However, it is advantageous to be able, despite everything, to continue to use the electrical machine or machines as a generator in order to provide the deceleration or braking of the vehicle, if only to alleviate the stress on the mechanical brakes of the vehicle. It is in fact advantageous to use these only in emergency maneuvers or for greater braking in order to avoid significant overheating in normal use. In addition, electrical braking affords ease of driving comparable to the sensations afforded in a conventional vehicle by the engine brake, which is of such a nature as to facilitate taking control of such vehicles by drivers whose reflexes have been forged by driving these conventional vehicles.

For all the reasons mentioned above, it is useful to be able to dissipate the excess electrical energy in an electrical element. It is well known how to use an electrical dissipation element. The dissipation will occur in the element by converting the electrical energy into heat: this is the Joule effect. The problem is then posed of being able to effectively cool this electrical dissipation element or elements.

In known arrangements, the electrical dissipation element or elements are sized and installed so as to be able to be cooled effectively by a circulation of air. For this purpose, either the electrical element or elements project with respect to the vehicle body or, if they are more integrated, it is necessary to provide apertures taking a certain air flow in order to channel it as far as the elements and then discharge it outside as is done to cool the radiator in any vehicle with a liquid cooled thermal engine. Unfortunately, in all cases, this necessarily causes degradation of the aerodynamic qualities of the vehicle.

In other arrangements known, for example, through the publication "Hybrid III" (available in DISS. ETH No. 11672, p. 21 and DISS. ETH No. 11784, pp. 30 and 60), the hybrid power train uses an electrical element immersed in the liquid of the thermal engine cooling system, in order to improve the efficiency of the dissipation of the electrical heat and in order to keep the thermal engine at an ideal operating temperature even when it is not delivering power.

Moreover, the electrical machine or machines and the electronic control module or modules associated with them must themselves be cooled as effectively as possible, since their efficiency cannot be 100%. This is all the more critical when the specific power of these electrical machines and/or or electronic modules rises. Despite all the care taken in the choice of the materials and the construction of the electrical machines or electronic modules, it is known that it is inevitable that, when a high electrical current is made to pass through the stator of these machines, it is necessary to discharge the heat due to the losses (by Joule effect, etc).

In order to ensure a discharge of this heat which is as effective as possible, it is well known that cooling by means of a heat-transfer liquid is much more effective than cooling by air. The majority of the time, this cooling circuit is a closed circuit in which a heat-transfer liquid circulates, put in contact with the components to be cooled and discharging the heat by virtue of a radiator. This solution has the advantage of great efficiency and allows fairly fine regulation of the operating temperature of the components of the electrical energy production system.

The electrical machine or machines driving the driving wheel or wheels of the vehicle and the majority of the electronic control modules of these electrical machines are in general also cooled by means of a cooling liquid. This guarantees good reliability of all these electrical components and good compactness thereof.

For example, patent application publication no. US2003/0001440 and U.S. Pat. No. 6,087,744 show electrical machines comprising a pipe for the circulation of a cooling liquid, the pipe being provided in an external sheath of the electrical machine. Patent application publication no. US2002/0027027 shows a cooling circuit common to, amongst other things, an electrical traction machine, a fuel cell and an electronic module controlling the electrical traction machine.

The patent application WO96/41393 describes a fuel cell for a vehicle in which an electrical element is immersed in the liquid of the fuel cell cooling circuit in order to be able to heat the fuel cell very quickly. The electrical element can where necessary be supplied with electrical current whilst producing electrical energy during the braking of the vehicle in order to accelerate the heating of the battery or to maintain its temperature. U.S. Pat. No. 6,448,535 also describes a fuel cell for a vehicle in which an electrical element is immersed in the liquid of a primary cooling circuit of the fuel cell in order to be able to prevent the liquid freezing since this is, according to this patent, necessarily de-ionized water. This primary cooling circuit is connected thermally to a secondary cooling circuit by liquid with which it exchanges its heat. The secondary cooling circuit is alone provided with a radiator for exchange with the atmosphere and is also used for cooling an electric motor.

The multiplicity of the schemes proposed shows that it is not so simple to design an electrical power train for a vehicle capable of managing high powers, using fairly compact components, whilst offering a response which is as dynamic as possible to the demands of the driver, in particular for braking rapidly and in complete safety, and whilst maintaining for all the components operating temperatures which are not prejudicial to their reliability.

BRIEF DESCRIPTION OF THE INVENTION

The objective of the invention is to afford a solution, well suited to automobile applications, to the necessary dissipation of the electrical energy created in excess by an electrical energy production installation such as a fuel cell when it is incapable of rapidly reducing the power delivered, and/or during the functioning in electrical braking of the vehicle.

The invention proposes an electrical power train for a vehicle, the power train comprising:
an electrical line;
an installation for producing electrical energy on board, the installation being connected to the electrical line, the installation having a first cooling circuit providing the cooling of the installation by means of a first heat-transfer liquid charge, the first cooling circuit comprising a first radiator for dissipating heat to the ambient atmosphere;
an electrical energy management unit;
at least one electrical machine connected to at least one driving wheel, connected to the electrical line by means of an electronic module controlling the electrical machine, the electrical machine being connected to a second cooling circuit comprising a second radiator for dissipating heat to the ambient atmosphere, the second cooling circuit using a second heat-transfer liquid charge independent of the first charge used in the first cooling circuit, the second cooling circuit also being thermally decoupled from the first cooling circuit; and
an electrical dissipation element able to be connected electrically to the electrical line, wherein the electrical dissipation element is immersed in the first cooling circuit.

In a particularly advantageous application of the invention, the installation comprises a fuel cell. With regard to the oxidant, either the combustion cell is supplied with compressed atmospheric air and the excess gas in which the proportion of oxygen has been reduced is discharged downstream of the fuel cell, or the fuel cell is supplied with pure oxygen. The latter solution has advantages, in particular a more dynamic response of the battery to a current demand, which is advantageous in particular for applications to transport machinery such as cars where it is known that they impose particularly intermittent operating conditions, unlike stationary applications. As advantages of a supply of pure oxygen to a fuel cell, it can be mentioned again that the efficiency and power density are better.

Having observed that, in the case of electrical braking, the electrical energy production installation on board the vehicle is not called on, or at least is much less called on, since a significant part of the electrical energy needed by the vehicle then comes from the deceleration of the vehicle, the invention provides two separate cooling circuits: a first cooling circuit with cooling liquid provides the cooling of the fuel cell and a second cooling circuit with cooling liquid, independent of the first one mentioned, concerns the electrical machine or machines connected to the driving wheels as well as the electronic control modules, in particular those controlling these electrical machines, and the electrical dissipation element is immersed in the first cooling circuit.

Since the electrical energy production system is not called on or is called on at low load during the electrical braking phases, the cooling capacity of the cooling circuit of this part of the vehicle is not called on. It will be understood therefore that the best location for the electrical element for dissipating the electrical braking energy is in the particular cooling circuit which concerns the electrical energy production system. This is because, with regard to the electrical machine connected to the driving wheels of the vehicle, whether functioning in traction or when braking, this electrical machine is liable to be stressed to the maximum of its capacities, as well as all the control devices thereof. However, the efficiency is substantially the same whatever the direction of energy transformation (electrical energy into kinetic energy or vice versa). The losses responsible for a release of heat are therefore always substantially the same.

Using the cooling circuit of the electrical machine or machines coupled mechanically to the wheels in order to and in addition to cool the electrical dissipation element would amount to stressing this cooling circuit all the more and having to size it accordingly. This constraint is dispensed with by installing the electrical dissipation element in the cooling circuit of the fuel cell since, during the electrical braking phases, it is not called on to deliver a significant amount of power. The cooling capacity of this cooling circuit is therefore available for discharging the heat produced by the electrical dissipation element.

It is judicious to provide two separate cooling circuits for another reason: the temperature levels of the circuits may be different. There will be an advantage in working at approximately 90° C., for example, for the cooling circuit of a thermal engine, or 70° C. to 80° C., for example, for the cooling circuit of a fuel cell and at a temperature of 50° C., for example, or even less if possible, on the cooling circuit for the electrical machines and associated control devices.

The invention is illustrated hereinafter by virtue of a particular, but not limiting, implementation in which the installation comprises a fuel cell. It may be a case of a fuel cell supplied with oxygen from a reservoir containing compressed oxygen. It may also be a case of a fuel cell supplied with oxygen by compression of the ambient air.

DESCRIPTION OF THE BEST EMBODIMENT OF THE INVENTION

Figure 1:
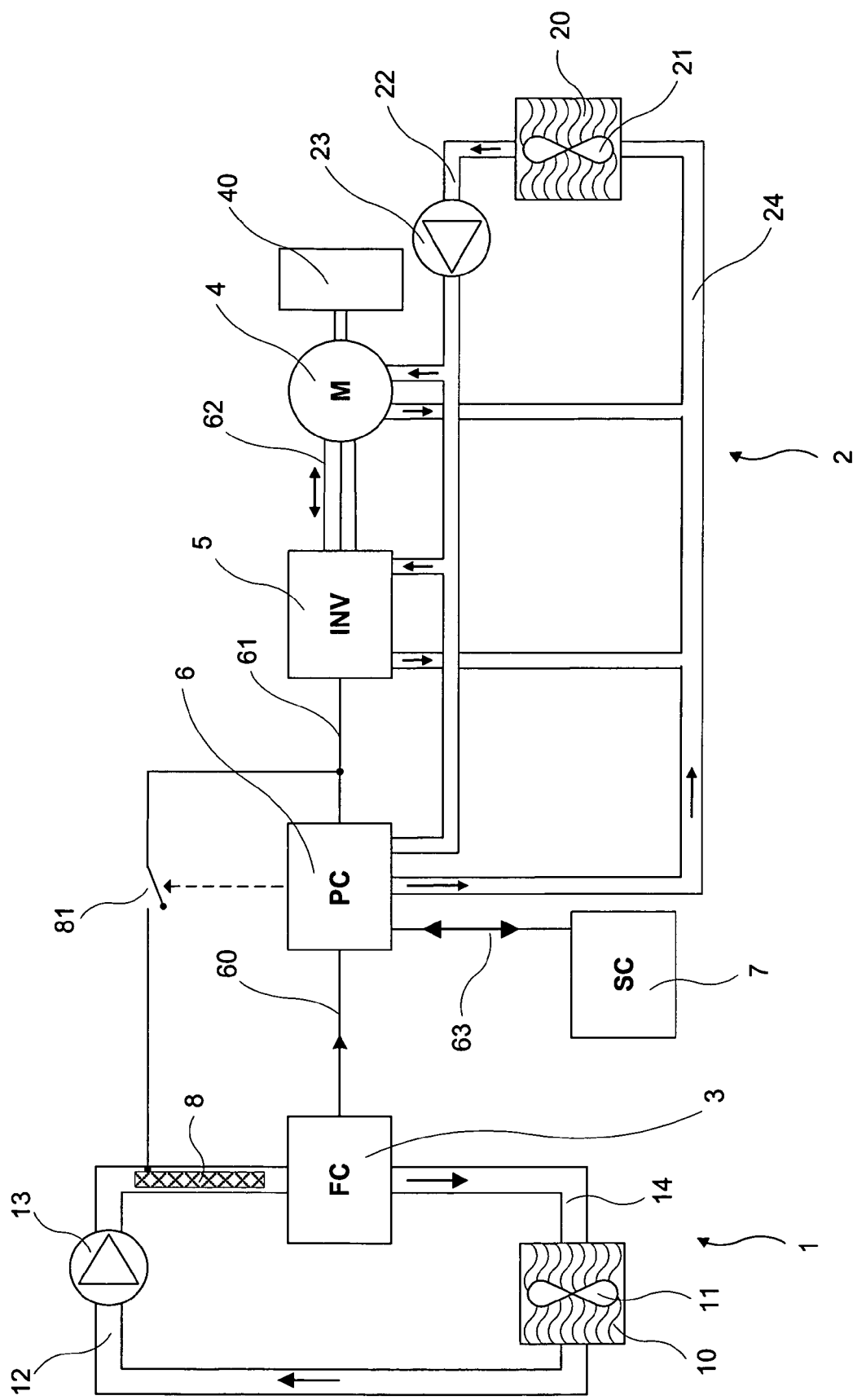
FIG. 1 depicts an exemplary embodiment of a cooling circuit(s) of the invention.

In FIG. 1, a fuel cell 3 is connected to an electrical energy management unit 6 by an electrical line 60. The fuel cell is preferably a polymer membrane cell (PEFC) or an alkaline cell (AFC). An electrical machine 4 is intended to be used as a traction motor or as a generator during the electrical braking phases. The electrical machine 4 is connected to at least one driving wheel 40. The electronic control module for the electrical machine is an inverter 5. An electrical line 61 connects the electrical energy management unit 6 to the inverter 5, and an electrical line 62 connects the inverter 5 to the electrical machine 4. Naturally, other electrical loads (not shown in FIG. 1) are connected to the line 61, such as for example, the vehicle air conditioner, numerous peripheral functions such as the vehicle lighting, or other main functions whose control, formerly essentially by mechanical method, is switching to electrical control, such as steering, brakes or even the vehicle suspension.

The power train according to the invention preferably comprises an electrical energy storage device connected to the electrical line 61 via the electrical energy management unit 6, and connected to the electrical energy management unit 6 by means of an electrical line 63. This electrical energy storage device is advantageously a bench of supercapacitors 7.

A first cooling circuit 1, in which a first cooling liquid charge circulates, provides the cooling of the fuel cell 3. The first cooling circuit 1 comprises a first radiator 10 for dissipating heat to the ambient atmosphere, a hydraulic pump 13, and a pipe 12 providing the distribution of the cooling liquid from the first radiator 10 to the fuel cell 3. The cooling liquid may be a de-ionized liquid in order not to be electrically conductive, for example, water or a mixture of de-ionized water and de-ionized glycol, since it circulates within the fuel cell itself (according to the importance of this electrical aspect, that is to say if it is important to increase the electrical impedance of the arm consisting of this cooling circuit). The direction of circulation of the heat-transfer liquid is indicated in the drawing. Pipe 14 is shown returning the cooling liquid after it is heated from the cell 3 to the first radiator 10, providing heat exchange with the ambient air. As is well known, the cooling of the radiator 10 is made more effective by the action of a fan 11 providing a forced circulation of the ambient air through the radiator 10.

A second cooling circuit 2 is also shown, independent of the first cooling circuit 1, and in which a cooling liquid circulates. The second cooling circuit 2 uses another heat-transfer liquid charge independent of the first charge used in the first cooling circuit. It is possible if necessary to use in the two cooling circuits a heat-transfer liquid with the same properties. In any case the charges are separate and therefore the liquids do not mix. The second cooling circuit is also thermally independent of the first cooling circuit 1. The second cooling circuit comprises a second radiator 20 for dissipating heat to the ambient atmosphere, different from the first radiator 10, a hydraulic pump 23 and a system of pipes providing the distribution of the cooling liquid to the various components which it has to cool. The direction of circulation of the heat-transfer liquid is indicated on the drawing. The second cooling circuit 2 establishes a circulation of cooling liquid in several electrical components. The cooling liquid is, for example, ordinary water or a mixture of water and glycol.

The power train, or more generally the vehicle propelled by the power train according to the invention, could possibly comprise various electronic management modules other than the inverter 5 already mentioned, the second cooling circuit 2 establishing a circulation of cooling liquid in several electronic management modules. Preferably, all the electronic management modules cooled by means of a cooling liquid are connected to the second cooling circuit 2.

Preferably, all the electrical components cooled by means of a cooling liquid are connected to this second cooling circuit 2. Advantageously, the electrical machine 4 mechanically connected to the driving wheel or wheels 40 of the vehicle is connected to this second cooling circuit 2.

Thus a network of pipes 22 can be seen providing the distribution of cooling liquid at low temperature to the electrical machine 4, to the inverter 5 and to the electrical energy management unit 6. There can also be seen a network of pipes 24 returning the cooling liquid after its heating from the electrical energy management unit 6, from the inverter 5 and from the electrical machine 4 to the second radiator 20. As is well known per se, the efficiency of the heat exchange of the second radiator 20 is reinforced by the action of a fan 21 providing a forced circulation of ambient air through the second radiator 20.

Advantageously, all the electrical components cooled by means of a cooling liquid are connected to the second cooling circuit 2.

An electrical dissipation element 8 is installed in the first cooling circuit 1. This dissipation element 8 is connected to the electrical line 61 via an electronic switch 81, itself controlled by the electrical energy management unit 6.

The electrical energy management unit 6 receives information coming from the vehicle driver and information describing the state of functioning of the vehicle, such as the speed of movement. In the electrical traction phase, the electrical energy management unit 6 directly connects the fuel cell 3 to the inverter 5 and the inverter 5 transmits the electrical energy in suitable form to the electrical machine 4 so that the latter functions as a motor. According to circumstances, the electrical energy management unit 6 can also connect the bench of supercapacitors 7 to the electrical line 61 during the phases of operating as a motor in order to draw on the electrical energy in reserve in the bench of supercapacitors 7 in order to add it to the energy coming from the fuel cell 3.

Each of the two cooling circuits is preferably regulated for temperature, for example by means of a thermostat, not shown in FIG. 1. Since the circuits are independent, the regulation temperature for each cooling circuit may be different. For example, the ideal regulation temperature for a fuel cell is a little higher than the ideal regulation temperature of a circuit providing the cooling of the electrical machine 4 and the electrical components which are associated with it. By way of illustration, the regulation temperature is around 60° C. to 90° C. for a polymer membrane cell (PEFC) and is around 45° C. to 65° C. for the circuit providing the cooling of the electrical machine 4 and the electronic components which are associated with it.

When the operating mode of the vehicle controlled by the electrical energy management unit 6 goes into electrical braking, the inverter 5 controls the electrical machine 4 as a generator so that it returns electrical energy over the line 61. If the electrical energy thus returned over the line 61 is greater than the requirements of the vehicle, that is to say than the energy absorbed by the other electrical loads connected to the line 61 such as those mentioned above, then the control of the fuel cell 3 stops the functioning of the latter. As the inertia of a fuel cell is very low, the fuel cell 3 rapidly ceases to communicate heat to the cooling liquid circulating in the first cooling circuit 1. During functioning as electrical braking, all the electrical loads connected to the line 61 will absorb some of the electrical energy available. Equally, the electrical energy management unit 6 sends the electrical energy as a priority to the bench of supercapacitors 7, provided that these have not reached their maximum charge.

However, if all these loads do not make it possible to absorb the electrical energy available on the line, which the electrical energy management 6 can detect for example by a rise in voltage on the line 61, then the electrical energy management unit 6 closes the switch 81 in order to add the dissipation element 8 as an electrical load. This element is capable of absorbing the maximum current injected on the line 61 by the electrical machine or machines 4. The electrical dissipation element 8 heats up and the heat is discharged gradually by the cooling liquid, which takes it to the first radiator 10. Naturally the installation is sized so that, even when the electrical dissipation element 8 has the maximum possible current running through it, the heating of the cooling liquid within the cooling circuit 1 remains compatible with the correct functioning of the fuel cell 3.

The efficiency of the discharge of the heat produced by the dissipation element 8 is such that, by comparison with a dissipation element which is cooled by air, it is possible to use much more compact elements 8. In addition, there is no degradation of the coefficient of penetration in the air of the vehicle. This is because the capacity of the radiator 10 is used to discharge heat at a time when it would not have been used because of the stoppage of the functioning of the fuel cell. Thus it has been possible to arrange the cooling circuits so as to use their capacities to the best possible extent and profiting from the mutually exclusive character of the functioning of the fuel cell at its maximum charge and the use of the dissipation element 8 at its maximum load.

Although the invention has been described in association with a fuel cell, it can be used also in the case of a serial hybrid vehicle or a parallel hybrid vehicle.

What is claimed is:

1. An electrical power train for a vehicle, the power train comprising:
   an electrical line;
   an installation for providing electrical energy for the vehicle, the installation being connected to the electrical line;
   a first cooling circuit for cooling the installation using a first heat-transfer liquid charge, wherein the first cooling circuit includes a first radiator for dissipating heat to an ambient atmosphere;
   an electrical energy management unit connected to the electrical line;
   a second cooling circuit for cooling an electrical machine, wherein the second cooling circuit includes a second radiator for dissipating heat to the ambient atmosphere, wherein the second cooling circuit uses a second heat-transfer liquid charge independent of the first heat-transfer liquid charge used in the first cooling circuit, and wherein the second cooling circuit may be selectively thermally decoupled from the first cooling circuit;
   an electrical dissipation element electrically connectable to and disconnectable from the electrical line under control of the electrical energy management unit, wherein the electrical dissipation element is immersed in the first heat-transfer liquid charge of the first cooling circuit; and
   a switch, controlled by the electrical energy management unit, for connecting the electrical dissipation element to and disconnecting the electrical dissipation element from the electrical line, wherein, when the electrical energy management unit detects an inability of the electrical line to carry away excess electrical energy, the electrical energy management unit causes the switch to connect the electrical dissipation element to the electrical line so that the electrical dissipation element may absorb at least some of the excess electrical energy and dissipate the absorbed excess electrical energy via the first heat-transfer liquid charge of the first cooling circuit.

2. The power train according to claim 1, wherein the installation includes a fuel cell supplied with pure oxygen.

3. The power train according to claim 1, wherein the installation includes a fuel cell supplied with oxygen by compression of ambient air.

4. The power train according to claim 1, further comprising a plurality of electronic management modules, wherein the second cooling circuit establishes a circulation of the second heat-transfer liquid charge in the plurality of electronic management modules.

5. The power train according to claim 1, wherein an electrical energy storage device is connected to the electrical line via the electrical energy management unit.

6. The power train according to claim 1, wherein the electrical energy management unit detects the inability of the electrical line to carry away excess electrical energy by detecting a rise in voltage on the electrical line.

7. The power train according to claim 1,
   wherein the electrical machine is connected to at least one driving wheel, and
   wherein the at least one electrical machine is connected to the electrical line via an electronic module controlling the electrical machine.

8. The power train according to claim 2, wherein the fuel cell is a polymer membrane cell or an alkaline cell.

9. The power train according to claim 3, wherein the fuel cell is a polymer membrane cell or an alkaline cell.

10. The power train according to claim 4, wherein all of the plurality of electronic management modules cooled by the second heat-transfer liquid charge are connected to the second cooling circuit.

11. The power train according to claim 7, wherein the electronic control module is an inverter.

* * * * *